Patented Dec. 11, 1923.

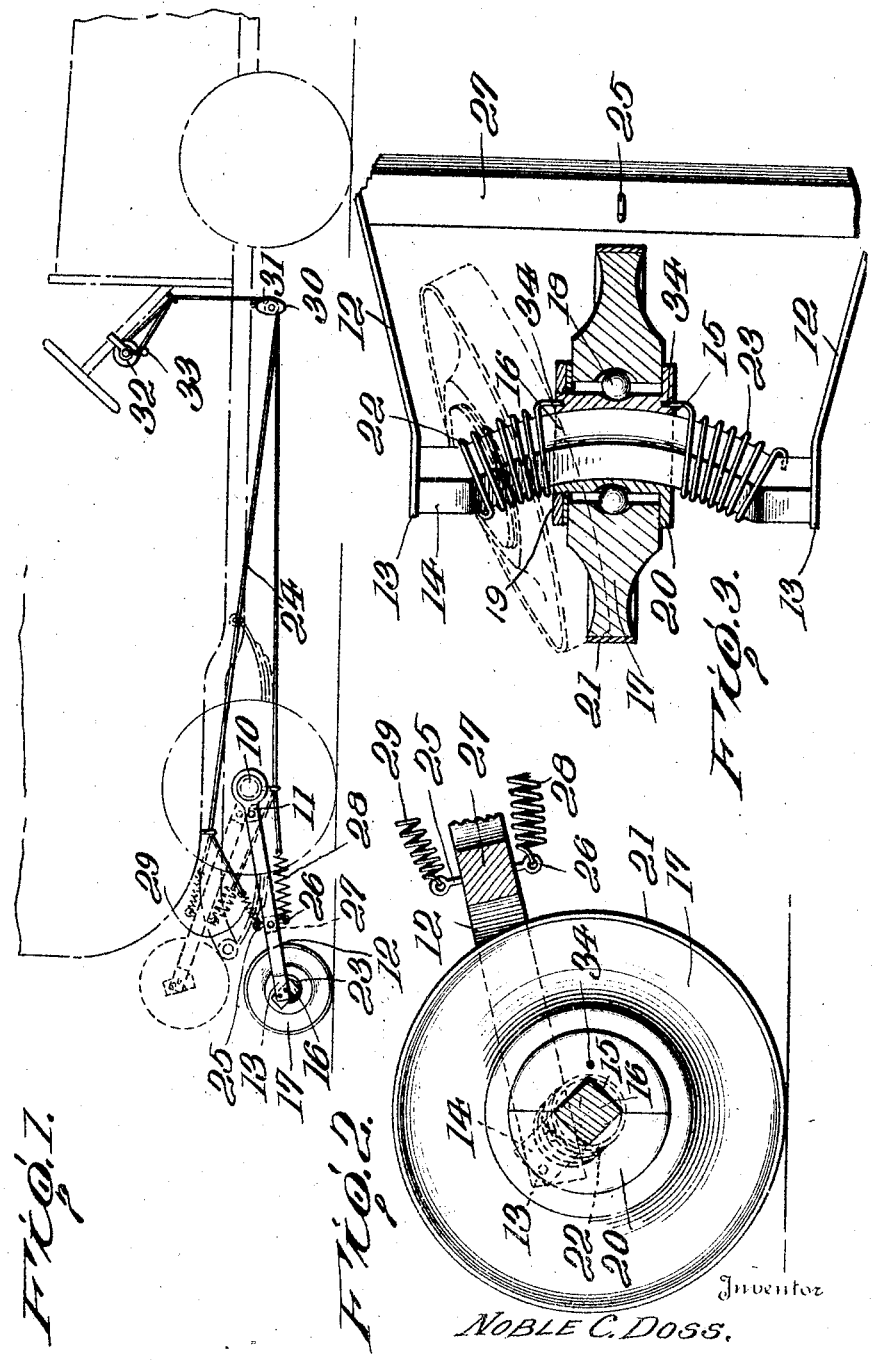

1,477,042

UNITED STATES PATENT OFFICE.

NOBLE C. DOSS, OF ATLANTA, GEORGIA.

ANTISKIDDING DEVICE.

Application filed April 5, 1922. Serial No. 549,719.

*To all whom it may concern:*

Be it known that I, NOBLE C. DOSS, a citizen of the United States, residing at Atlanta, in the county of Fulton and State of Georgia, have invented certain new and useful Improvements in Antiskidding Devices, of which the following is a specification.

The invention relates to anti-skid devices, and has as an object the provision of a device which will prevent skidding of automobiles. A further object of the invention is the provision of a device which may be readily raised out of operative position when its service is not required. Further objects of the invention will appear from the following description. An illustrative embodiment of the invention is shown in the accompanying drawings, in which—

Fig. 1 is a side elevation of the device shown as applied to an automobile, which latter is shown in dotted lines;

Fig. 2 is a detail vertical section, and

Fig. 3 is a detail horizontal section, the parts being shown in plan.

As shown in Fig. 1, the device is adapted to be pivotally secured to the rear axle 10 of an automobile but may be secured to any other convenient portion of the rear end of the vehicle, and may be applied to any vehicle upon which its service is desirable.

Secured to the clips 11 which pass about the axle 10 there are shown a pair of side arms 12 which extend rearwardly from the axle 10. Secured between the rear ends 13 of the arms 12 is shown an axle 14 which is so formed that a bushing 15 will not revolve thereon. As shown, the axle 14 is square in outline but of any other configuration may be utilized if the bushing 15 be configured to interact therewith and if means be provided to prevent revolution of the bushing 15 thereon.

The axle 14 must be rigidly secured to the arms 13 with sufficient firmness to stand the strain caused by attempts of the vehicle to skid.

The axle 14 is shown as formed upon the arc of a circle at its central portion 16 and the plane of the circle of which the portion 16 is an arc is disposed at an angle of 45° to the ground, extending downwardly and forwardly when the device is in position for operation.

The interior of the bushing 15 is formed upon the arc of a circle so as to make a close fit with the portion 16 of the axle and to be slidable thereon.

To make contact with the ground a wheel 17 is shown as mounted upon the bushing 15 by means of ball bearings 18 and may be retained thereon by means of flanges 19, 20, one of which may be made in a separate piece from the bushing 15, for purposes of assembly. As shown the wheel 17 is equipped with a solid tire 21, preferably of rubber, but any other desirable form of tire which will not readily slide upon the surface of the pavement may be substituted for the form shown.

To return the bushing 15 to its central position when it is pushed therefrom by attempts of the vehicle to skid, springs 22—23 are shown encircling the axle 14 and abutting against the exterior of the flanges 19 and 20. These springs are shown as having their extremities 34 extended and contacted with the bushing 15 at a point opposite the convexity of the curved portion of the axle 16 whereby they are enabled to cause the bushing 15 to move on the axle to the central position. Should they be allowed to press against the bushing upon the concave side of the axle the only result would be to cause the bushing to grip upon the axle and not move thereon.

To control the position of the device in or out of operative position a cable 24 is shown secured to eyes 25—26 secured to cross bar 27 of the frame of the device, springs 28—29 being interposed in the connection. The cable 24 is shown as passed about pulleys 30—31 beneath the vehicle adjacent the driver's position, and as being led to a drum 32 which may be controlled by a crank 33.

With the cable arranged as shown, when the drum is revolved in one direction the device will be raised to the dotted line position shown in Fig. 1 and will be out of service, the strength of the spring 29 being sufficient to surely lift the weight of the device and hold the same raised. When the device is to be brought into operation, as in the case of wet streets, the drum 32 may be operated in the reverse direction lowering the device to the ground, and by continuance of such operation the spring 28, which is made much stronger than spring 29, will be stretched, causing any desired pressure of the wheel 17 upon the ground.

With the device in operative position the first movement of skidding of the rear wheels of the vehicle will cause the wheel 17 to move out of its central position, the bushing 15 sliding laterally on the curved axle 14 and compressing one of the springs 22—23. Since the resistance to movement of a rubber tire is considerably greater when it is pulled across a pavement in a position inclined in the direction of movement than when it is perpendicular thereto, the resistance of the tire 21 will be at its maximum to prevent such action of the vehicle. Furthermore the extension of the frame 12 to the rear will provide a leverage through which the resistance to skidding of the wheel 17 will act upon the rear of the vehicle, causing such resistance to be much greater than would be that of the wheels of the vehicle.

In addition to the resistance of the sliding of the wheel 17, as a deterrent to the skidding, said wheel will, by its movement upon the curved axle, assume a position wherein the plane thereof will be disposed at an angle to the progress of the vehicle, as shown in dotted lines in Fig. 3, in such a direction as to tend to act as a rudder to steer the vehicle back into its desired direction. This position of the wheel will not only cause its action to be in the nature of a rudder, but will also place the same in such a position as to have a maximum resistance to being drawn over the pavement since it will assume a position wherein the plane of the wheel will be substantially perpendicular to such skidding movement and, due to the angle of inclination of the axle, will be inclined to the pavement in the manner in which a squeegee is held for operation. Since the curvature of the axle is at the angle shown, the skidding movement of the vehicle will cause movement of the bushing upon the curved axle, but with the shown relation of the parts, lateral pressure upon the wheel applied posterior to the central vertical plane of the wheel will not cause such movement. Therefore when backing the vehicle to which the device is applied, the wheel 17 will remain in a central position.

When the skidding movement has ceased and the vehicle proceeds upon its true course the spiral springs 22—23 will return the wheel to its central position. The action of the device is obviously automatic and it will begin immediately when the first movement of skidding takes place. The means for lowering and for suspending the device out of operation may be that shown, or any other desirable means operable from the driver's seat or not, as preferred.

The sliding action of the wheel 17 will obviously place downward pressure upon the end 14 of the axle toward which the skidding takes place, and thereby twist the frame carrying the wheel in such a manner as to increase the pressure of the wheel of the vehicle toward which the skidding is taking place upon the ground. At the same time and for the same reason the vehicle wheel having the greatest traction will have its traction decreased by the twisting action of the wheel 17. Since a vehicle will skid to the side upon which the wheel having the least grip upon the ground is located the device provided by the invention will tend to prevent skidding by this increase of pressure, causing a more nearly equal grip of the two wheels of the vehicle upon the ground.

Minor changes may be made in the physical embodiment of the invention without departing from its spirit.

I claim:

1. An anti-skidding device comprising, in combination, a frame adapted to be pivotally secured to the rear portion of a vehicle, a wheel carried by said frame adapted to contact with the pavement, means whereby said wheel may be controlled to move to a position with its plane at an angle to the forward direction of movement of the vehicle and out of perpendicular to the road surface when skidding begins.

2. An anti-skidding device comprising, in combination, a frame adapted to be pivotally secured to the rear portion of a vehicle, a wheel carried by said frame adapted to contact with the pavement, a biting edge on said wheel, means whereby said wheel may be controlled to move to a position with its plane at an angle to the forward direction of movement of the vehicle and out of perpendicular to the road surface when skidding begins, whereby to cause said edge to bite the road surface.

3. An anti-skidding device comprising, in combination, a frame adapted to be pivotally mounted upon the rear of the vehicle, an axle carried by said frame, the center of said axle being curved in a plane downwardly and forwardly relative to said vehicle, a wheel mounted upon said axle and slidable thereon, yieldable means to preserve said wheel in a normal central position, whereby skidding movement of the vehicle will move said wheel into a position wherein its plane will be at an angle to the desired direction of the vehicle and perpendicular to its skidding movement.

4. An anti-skidding device comprising, in combination, a frame adapted to be pivotally secured to the rear of a vehicle, an axle rigidly secured upon said frame, a curved portion of said axle being formed upon the arc of a circle whose plane is downwardly and forwardly inclined to the pavement, a bushing mounted upon said axle for sliding movement, means to prevent rotation of said bushing upon said axle, a wheel revolubly mounted on said bushing, means to resiliently press said wheel against the pavement, and means to yieldingly preserve said bushing normally in a central position whereby skidding movement of the vehicle will move the plane of said wheel to an angle to the desired direction of the vehicle such as to tend to restore its proper movement and to cause maximum resistance to sliding of said wheel.

NOBLE C. DOSS.